Nov. 10, 1931.  G. A. KING  1,831,307
TACK FASTENED STUD FOR SNAP FASTENERS
Filed April 18, 1930
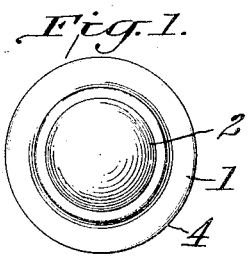
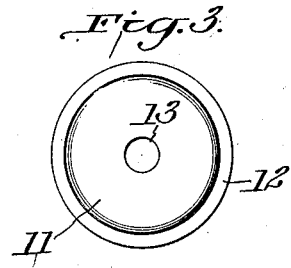
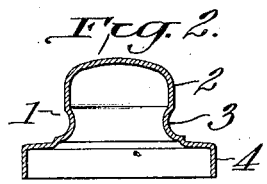
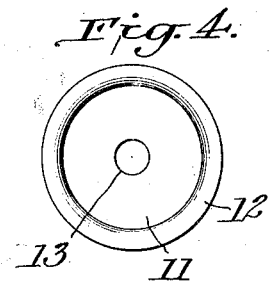
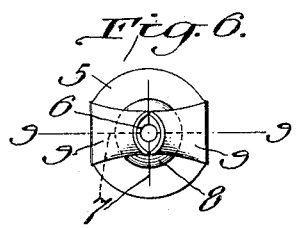
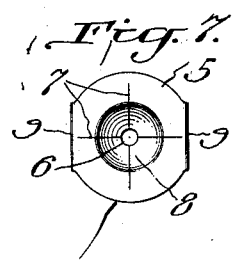
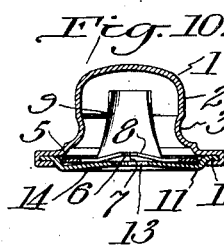
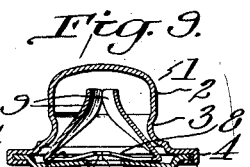
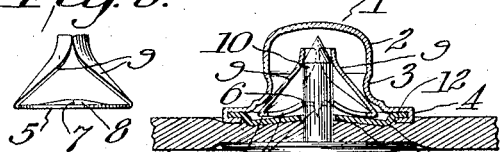
Inventor
George A. King
by
Wm H Fincrel
Attorney Patented Nov. 10, 1931

1,831,307

UNITED STATES PATENT OFFICE

GEORGE A. KING, OF WATERBURY, CONNECTICUT, ASSIGNOR TO SCOVILL MANUFACTURING COMPANY, OF WATERBURY, CONNECTICUT, A CORPORATION OF CONNECTICUT

TACK FASTENED STUD FOR SNAP FASTENERS

Application filed April 18, 1930. Serial No. 445,409.

This invention relates to snap fastener elements and particularly to the stud member of a snap fastener adapted to be attached to an article by means of a tack.

The invention embodies improvements over the devices of a similar nature disclosed by the patent of Frank E. Warner, No. 1,690,082, of October 30, 1928, and the copending application of Frank E. Warner, Serial No. 366,884, filed May 29, 1929.

In the inventions of the above-mentioned patent and copending application, a tack-engaging member is provided within the snap fastener element whereby the shank of the attaching tack is frictionally engaged and the tack and fastener member held against relative tipping. In the patent mentioned, this tack-engaging member has a base provided with what is termed "a jagged edge hole" by which the shank of the tack is frictionally engaged upon its insertion through the hole; and in the copending application mentioned the tack-engaging member has a base provided with a hole of less diameter than the diameter of the shank of the tack and with radial slits converging upon this hole whereby when the shank of the tack is inserted through the hole it will be frictionally engaged. In the patent mentioned the tack-engaging member is of relatively heavy material; but in the copending application mentioned the tack-engaging element is of relatively thin resilient material, and its base is substantially flat, as is also the base member of the snap fastener element by which the tack-engaging member is retained within such element.

The object of my invention is to provide a snap fastener element having substantially the same characteristics of structure and operation as those of the copending application above mentioned, but so modified as to produce not only an inherently stronger snap fastener element but one in which the frictional engagement with the shank of the attaching tack is measurably increased.

I have found that by impressing the base of the resilient tack-engaging element, to provide a conical surface surrounding the opening therein, a much better frictional engagement with the shank of the tack is secured than is possible where the base is flat. I have also found that by impressing the base member so as to form a conical surface surrounding the hole therein through which the shank of the tack passes this base member is materially strengthened and its cooperative support for the tack-engaging member made more effective.

My invention contemplates a snap fastener element, such as a snap fastener stud, adapted to be attached to an article by means of a tack, such snap fastener element including a shell, a tack-engaging member and a base member, the tack-engaging member being retained within the shell, in predetermined relation thereto, by the base member, and comprising a base provided with an opening for the reception of the shank of the tack and slitted to form spring fingers surrounding the opening and adapted to frictionally engage the shank of the tack upon its insertion through the opening, the base being impressed to provide a substantially conical surface surrounding the opening, and having offstanding arms converging axially of said opening to support the shank of the tack against tipping, and the base member provided with a hole for the passage of the tack shank and being impressed to form a conical surface converging at such hole whereby the base member is strengthened and provides a suitable substantially complemental support for the base of the tack-engaging member and aids in guiding the point of the tack into the opening in the base of the tack-engaging member, all as I will proceed now more particularly to explain and finally claim.

In the accompanying drawings illustrating the invention, in the several figures of which like parts are similarly designated, Figures 1 and 2 are a top plan view, and an axial section, respectively, of the shell of the fastener element. Figs. 3 and 4 are bottom and top plan views, respectively, of the base member, and Fig. 5 is an axial section thereof. Figs. 6, 7 and 8 are top plan, bottom plan, and side elevational views, respectively, of the tack-engaging member. Fig. 9 is an axial section of the assembled snap fastener element, taken in the plan of line 9—9 of the tack-engaging member, Fig. 6. Fig. 10 is a section similar to Fig. 9 but taken in a plane at 90° thereto. Fig. 11 is a side elevation of a tack suitable for attaching my snap fastener element. Fig. 12 is a section similar to Fig. 9, showing the snap fastener element attached to or set upon an article.

The snap fastener element, shown in the drawings as a rigid tack fastened snap fastener stud, comprises a shell 1 shaped to form a head portion 2, a reduced neck 3 and a flange 4; and within this shell is mounted the tack-engaging member (Figs. 6, 7 and 8) comprising a base 5 provided with an opening 6 and slits 7 converging at this opening, the base being impressed or "coned", as shown at 8, to provide a relatively straight-walled conical surface surrounding and converging upon or having its apex in the opening 6, and the base is also provided with offstanding arms 9 converging axially of the opening 6, at some distance from the base, to engage, or embrace, the shank 10 of the attaching tack (Figs. 11 and 12) and prevent relative tipping between the fastener element and tack when attached. This tack-engaging member is retained within the shell by means of the base member 11 having a flange 12 over which the flange 4 of the shell is closed in. The base member 11 is provided with a hole 13 of a diameter greater than that of the shank of the tack, and is impressed or dished or "coned", as indicated at 14, (Fig. 5) to form a conical surface surrounding the hole 13, whereby the base member is strengthened and provides a surface which forms a suitable bearing for the base of the tack-engaging member.

As will be seen, particularly by reference to Figs. 6, 7, 9, 10, 11 and 12, the opening 6 of the base 5 of the tack-engaging member is of considerably less diameter than the diameter of the shank 10 of the tack, and hence, when the fastener element is attached to or set upon an article, indicated by 15, Fig. 12, the shank when forced into the element through the hole 13 in the base member will cause the spring fingers formed by the slits 7 to yield sufficiently to let it pass through the opening 6 and into supporting, anti-tipping relation to or engagement with the arms 9, the arcuate edges of the fingers thus frictionally engaging the shank and being in position to bite into same if any tendency of the tack to withdraw should occur. This biting tendency of the arcuate edges of the fingers, and hence the gripping power of the tack-engaging member, is enhanced by the cone-like impression of the base 5 around the opening 6 for the reason that the fingers, when distorted by insertion of the shank 10 of the tack, assume a more acute angle relatively to such shank than when the base is flat, (compare Fig. 12 with Figs. 10 and 11), and hence present their sharp arcuate edges at a better biting angle thereto to hold the snap fastener element and the tack in secure union.

By impressing or dishing the base member 11 it is given an arch formation, in cross section, which materially adds to its strength, and at the same time forms a seat for the base 5 of the tack-engaging member conforming more to its shape than would a flat base member and thus forming a better support for the tack-engaging member. Moreover, this coned base member 11 has a tendency to guide the point of the tack shank 10 into the hole 13.

Various changes and modifications in the structure and arrangement of the parts of the fastener element are deemed to be within the spirit of the invention and the scope of the following claims.

What I claim is:—

1. A snap fastener element, adapted to be attached to an article by means of a tack, said element including a shell, and a tack-engaging member arranged in said shell and comprising a base having an opening and slits converging at said opening to form spring fingers, said base preformed with a conical surface surrounding said opening to guide the tack into said opening and enhance the frictional engagement of said fingers with the shank of the tack, and arms offstanding from said base and converging axially of said opening to engage said shank and prevent tipping of the element relatively thereto.

2. A snap fastener element, adapted to be attached to an article by means of a tack, said element including a shell and a base member, and a tack-engaging member arranged in said shell and comprising a base having an opening and slits converging at said opening to form spring fingers, said base preformed with a conical surface surrounding said opening to guide the tack into said opening and enhance the frictional engagement of said fingers with the shank of the tack, and arms offstanding from said base and converging axially of said opening to engage said shank and prevent tipping of the element relatively thereto, said shell and base member united to retain the tack-engaging member within the fastener element.

3. A snap fastener element, adapted to be attached to an article by means of a tack, said element including a shell, a tack-engaging member arranged in said shell and comprising a base having an opening and slits converging at said opening to form spring fingers, said base impressed to provide a conical surface surrounding said opening to guide the tack into said opening and enhance the frictional engagement of said fingers with the shank of the tack, and arms offstanding from said base and converging axially of said opening to engage said shank and prevent tipping of the element relatively thereto, and a base member joined to said shell and retaining said tack-engaging member within said shell, said base member provided with a hole to receive the shank of the tack and impressed to form a conical surface surrounding said hole, said conical surface providing a substantially rigid supporting surface for the base of said tack-engaging member.

4. A tack-engaging member for tack-attached fastening elements, said member comprising a base having an opening and slits converging at said opening to form spring fingers, said base preformed with a conical surface surrounding said opening to guide the attaching tack into said opening and enhance the frictional engagement of said fingers with the shank of the tack, and arms offstanding from said base and converging axially of said opening to engage said shank and prevent tipping of the element relatively thereto.

In testimony whereof I have hereunto set my hand this 17th day of April, A. D. 1930.

GEORGE A. KING.